United States Patent
Mathew et al.

(10) Patent No.: US 9,363,749 B2
(45) Date of Patent: Jun. 7, 2016

(54) DYNAMIC POWER SCALING OF DIGITAL MODEMS

(71) Applicant: QUALCOMM Incorporated, San Diego, CA (US)

(72) Inventors: Deepak Mathew, Acton, MA (US); Garret Webster Shih, Brookline, MA (US); Jose Fridman, Newton, MA (US); Robin Lee Brown, Leominster, MA (US)

(73) Assignee: QUALCOMM INCORPORATED, San Diego, CA (US)

( * ) Notice: Subject to any disclaimer, the term of this patent is extended or adjusted under 35 U.S.C. 154(b) by 188 days.

(21) Appl. No.: 13/968,153

(22) Filed: Aug. 15, 2013

(65) Prior Publication Data

US 2014/0071869 A1    Mar. 13, 2014

Related U.S. Application Data

(60) Provisional application No. 61/700,831, filed on Sep. 13, 2013.

(51) Int. Cl.
*H04B 7/00* (2006.01)
*H04W 52/02* (2009.01)

(52) U.S. Cl.
CPC .......... *H04W 52/02* (2013.01); *H04W 52/0245* (2013.01); *H04W 52/0287* (2013.01); *H04W 52/028* (2013.01); *Y02B 60/50* (2013.01)

(58) Field of Classification Search
CPC ............ H04W 52/02; H04W 52/0827; H04W 52/241; H04W 52/383; H04B 10/564
See application file for complete search history.

(56) References Cited

U.S. PATENT DOCUMENTS

| | | | | |
|---|---|---|---|---|
| 8,195,099 | B2 * | 6/2012 | Bhattad | H04L 1/0026 455/452.2 |
| 8,725,083 | B2 * | 5/2014 | Yavuz | H04W 52/241 455/127.1 |
| 2008/0057918 | A1 * | 3/2008 | Abrant et al. | 455/414.1 |
| 2009/0029652 | A1 | 1/2009 | Xie et al. | |
| 2009/0042596 | A1 * | 2/2009 | Yavuz et al. | 455/522 |
| 2009/0087197 | A1 * | 4/2009 | Welch | 398/209 |
| 2009/0170437 | A1 * | 7/2009 | Bhattad et al. | 455/63.1 |
| 2010/0048236 | A1 * | 2/2010 | Higuchi et al. | 455/522 |
| 2010/0322090 | A1 | 12/2010 | Zhang et al. | |
| 2011/0072295 | A1 | 3/2011 | Shahidi et al. | |
| 2011/0113269 | A1 | 5/2011 | Park | |
| 2011/0208984 | A1 | 8/2011 | Naware et al. | |
| 2011/0319120 | A1 | 12/2011 | Chen et al. | |

(Continued)

OTHER PUBLICATIONS

International Search Report and Written Opinion—PCT/US2013/055335, International Search Authority—European Patent Office, Oct. 18, 2013.

(Continued)

*Primary Examiner* — Brian O'Connor
(74) *Attorney, Agent, or Firm* — Seyfarth Shaw LLP

(57) ABSTRACT

A system and method dynamically scale power consumed by the circuitry of an electronic device based on channel state and/or data rate. The electronic device then operates according to the power scaling. The scaling may be in accordance with an effective data rate, a number of multiple input multiple output (MIMO) layers, receiver type, a cell scenario, or a number of carriers. A number of MIMO layers can be predicted based on at least one of channel conditions or a channel quality index (CQI).

22 Claims, 12 Drawing Sheets

(56) References Cited

U.S. PATENT DOCUMENTS

2012/0058799 A1* 3/2012 Takahara et al. .............. 455/522
2012/0173836 A1 7/2012 Yermalayeu
2012/0329509 A1* 12/2012 Ravichandran et al. ...... 455/522
2013/0012256 A1* 1/2013 Higuchi et al. ............... 455/522
2013/0294390 A1* 11/2013 Yang et al. .................... 370/329
2013/0344913 A1* 12/2013 Li et al. ......................... 455/522
2014/0212150 A1* 7/2014 Welch et al. .................. 398/183

OTHER PUBLICATIONS

Taiwan Search Report—TW102132975—TIPO—Dec. 23, 2014.

* cited by examiner

| CQI Index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 8

DYNAMIC POWER SCALING OF DIGITAL MODEMS

CROSS-REFERENCE TO RELATED APPLICATION

This application claims the benefit under 35 U.S.C. §119 (e) to U.S. Provisional Patent Application No. 61/700,831 entitled "Dynamic Power Scaling of Digital Modems," filed on Sep. 13, 2012, the disclosure of which is expressly incorporated by reference herein in its entirety.

BACKGROUND

1. Field

Aspects of the present disclosure relate generally to wireless communication systems, and more particularly to dynamically scaling clock and frequency to match the processing power to be consumed by an electronic device, such as a modem.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes dynamically scaling power consumed by circuitry of an electronic device based at least in part on at least one of a channel state or data rate.

Another aspect discloses wireless communication having a memory and at least one processor coupled to the memory. The processor(s) is configured to dynamically scale power consumed by circuitry of an electronic device based at least in part on at least one of a channel state or data rate.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operation of dynamically scaling power consumed by circuitry of an electronic device based at least in part on at least one of a channel state or data rate.

Another aspect discloses an apparatus including means for means for dynamically scaling power consumed by circuitry of an electronic device based at least in part on at least one of a channel state or data rate. The apparatus also includes means for operating the electronic device according to the scaled power.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 8 illustrates a channel quality indicator (CQI) index table, according to an aspect of the present disclosure.

DETAILED DESCRIPTION

Figure 1:
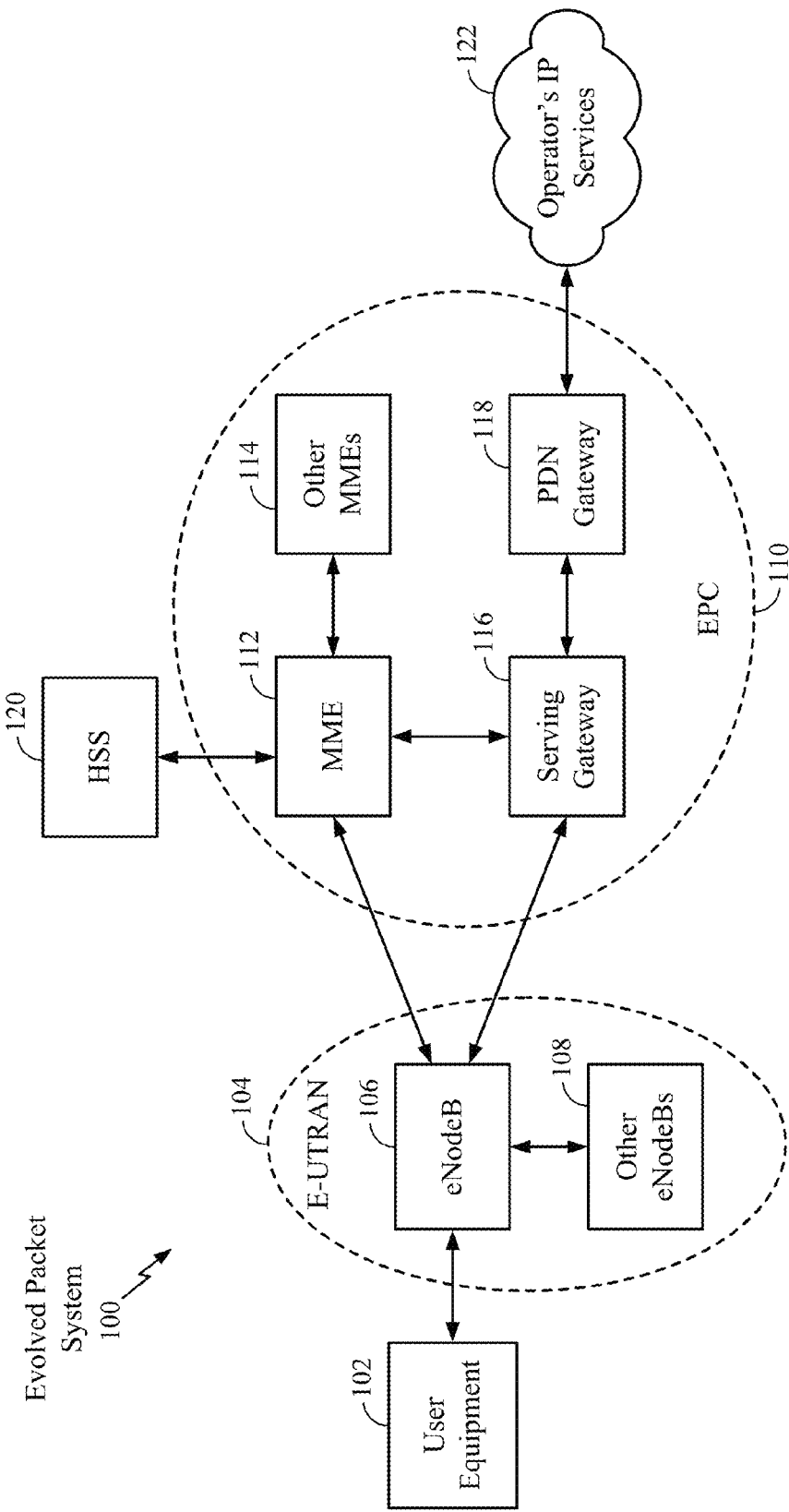
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player) a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
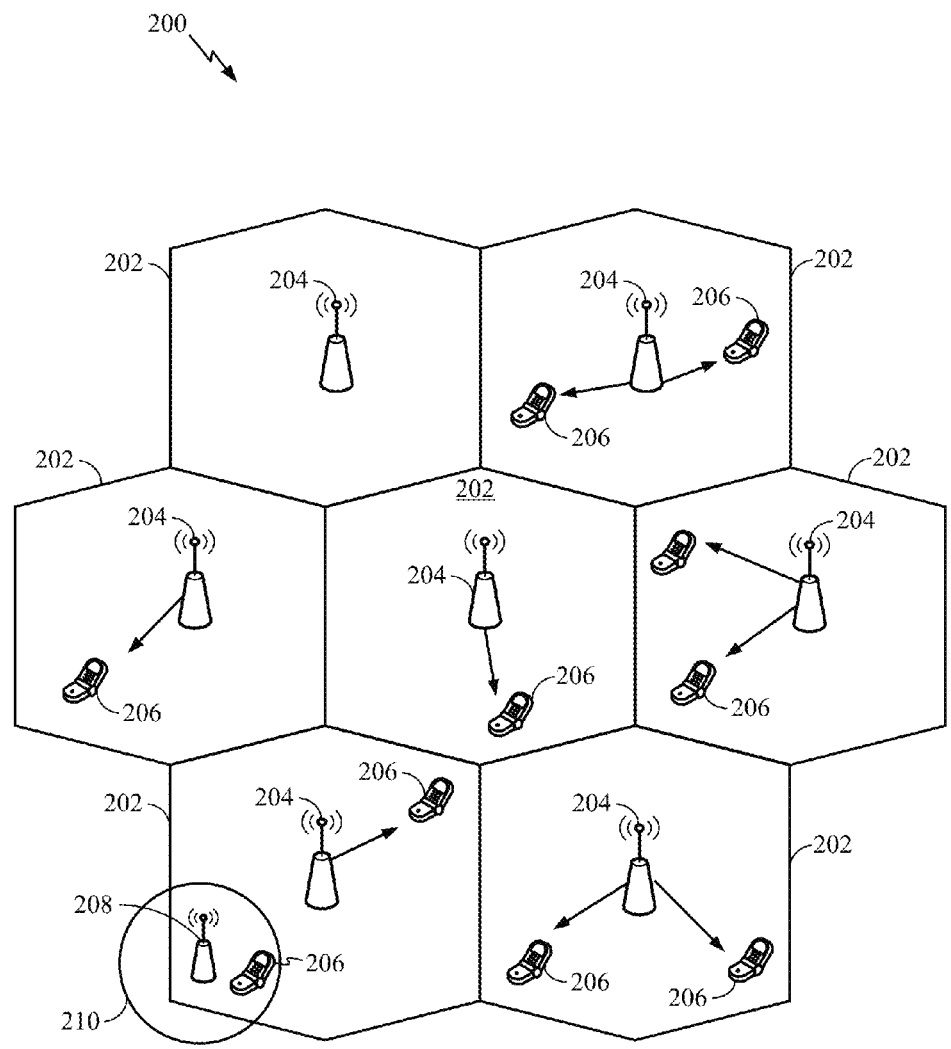
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
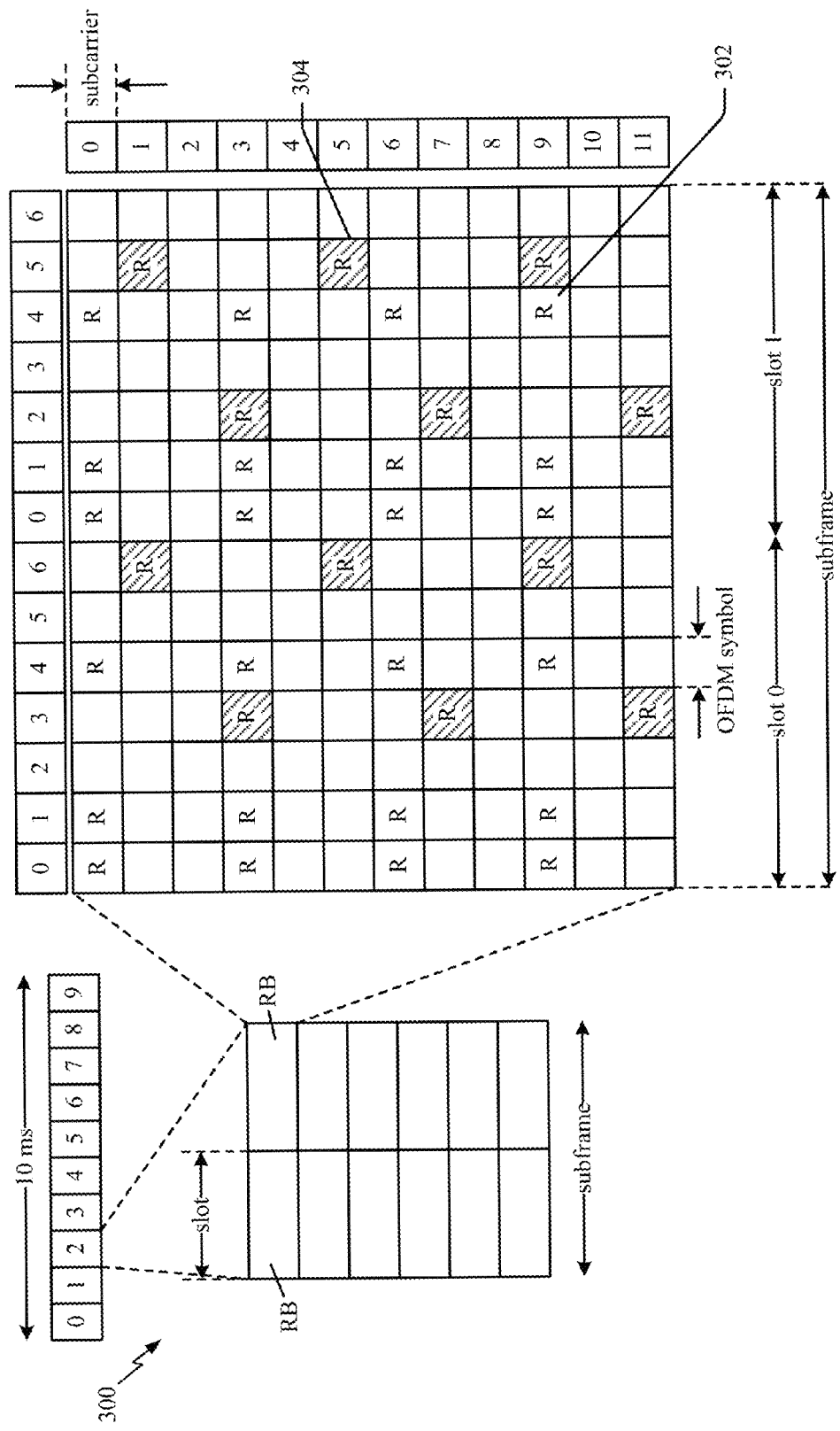
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
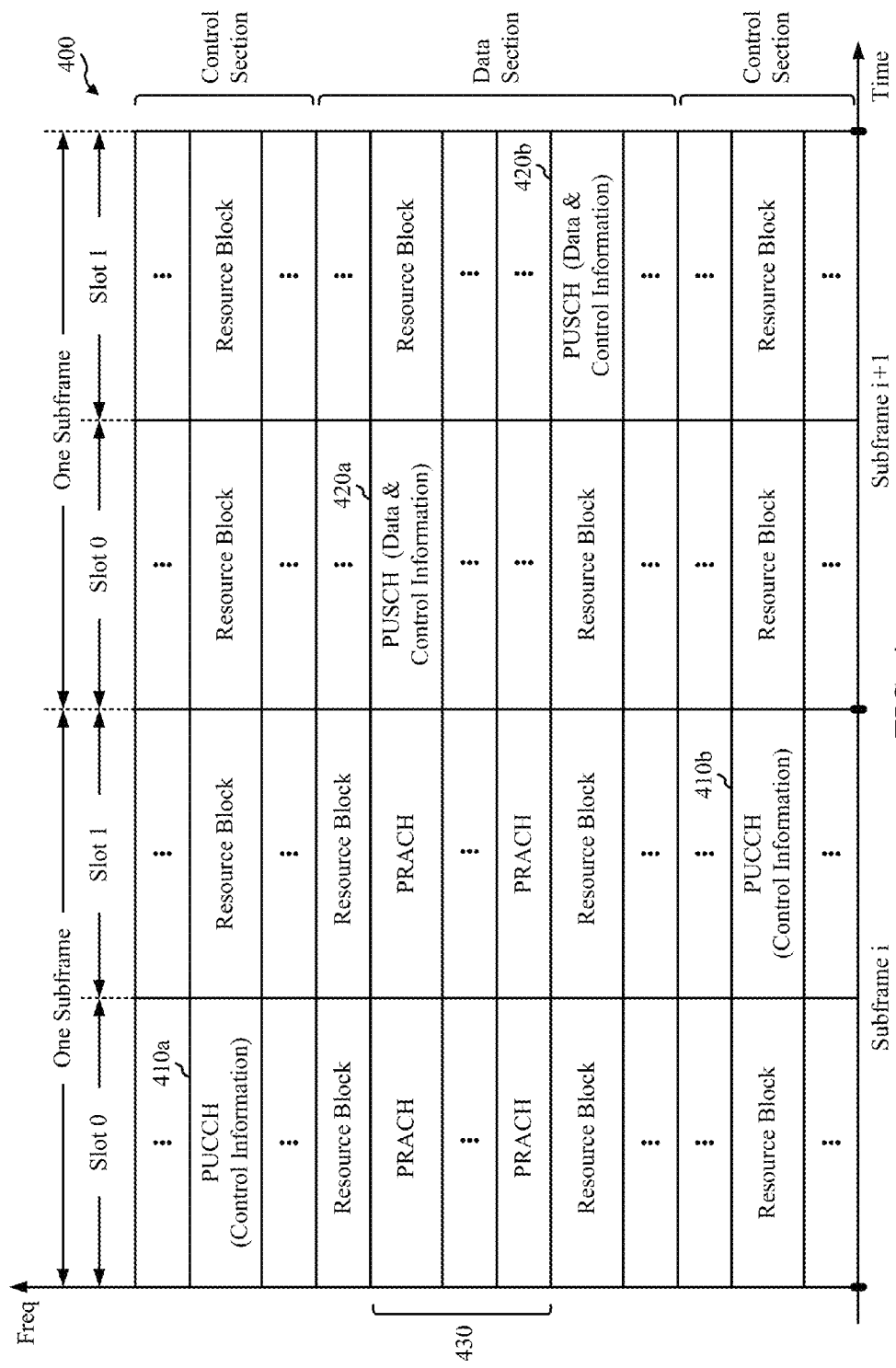
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
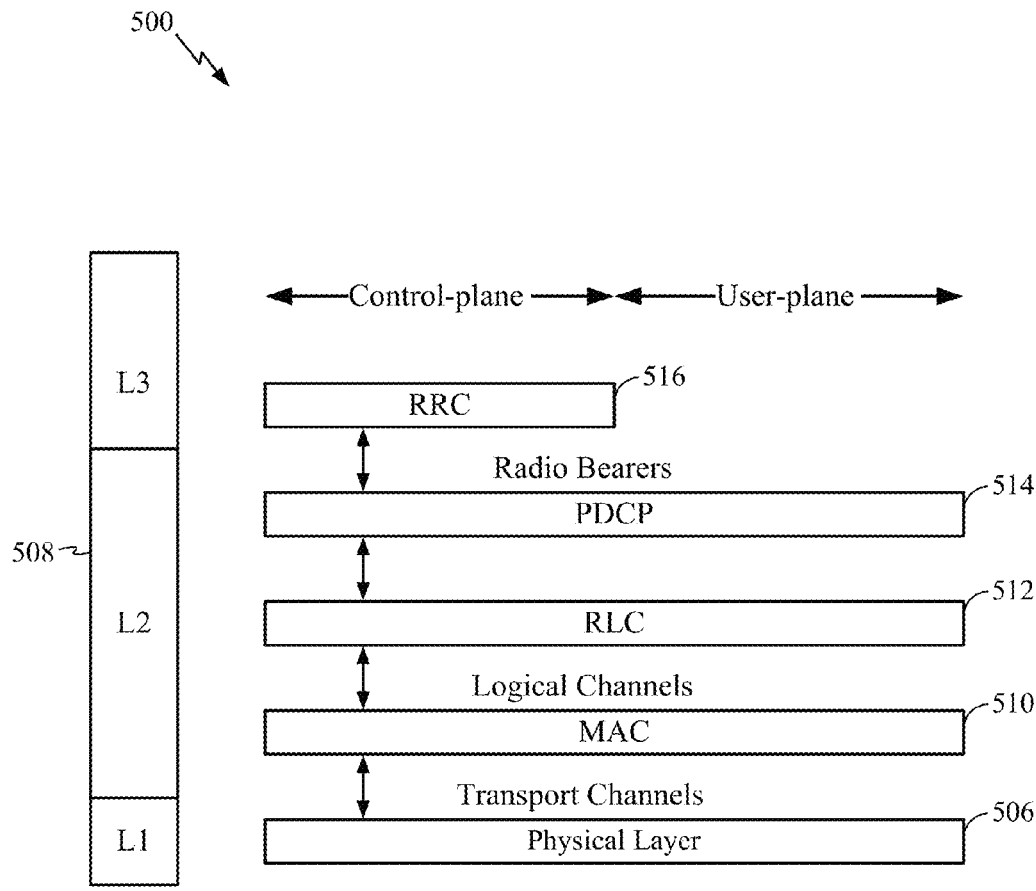
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
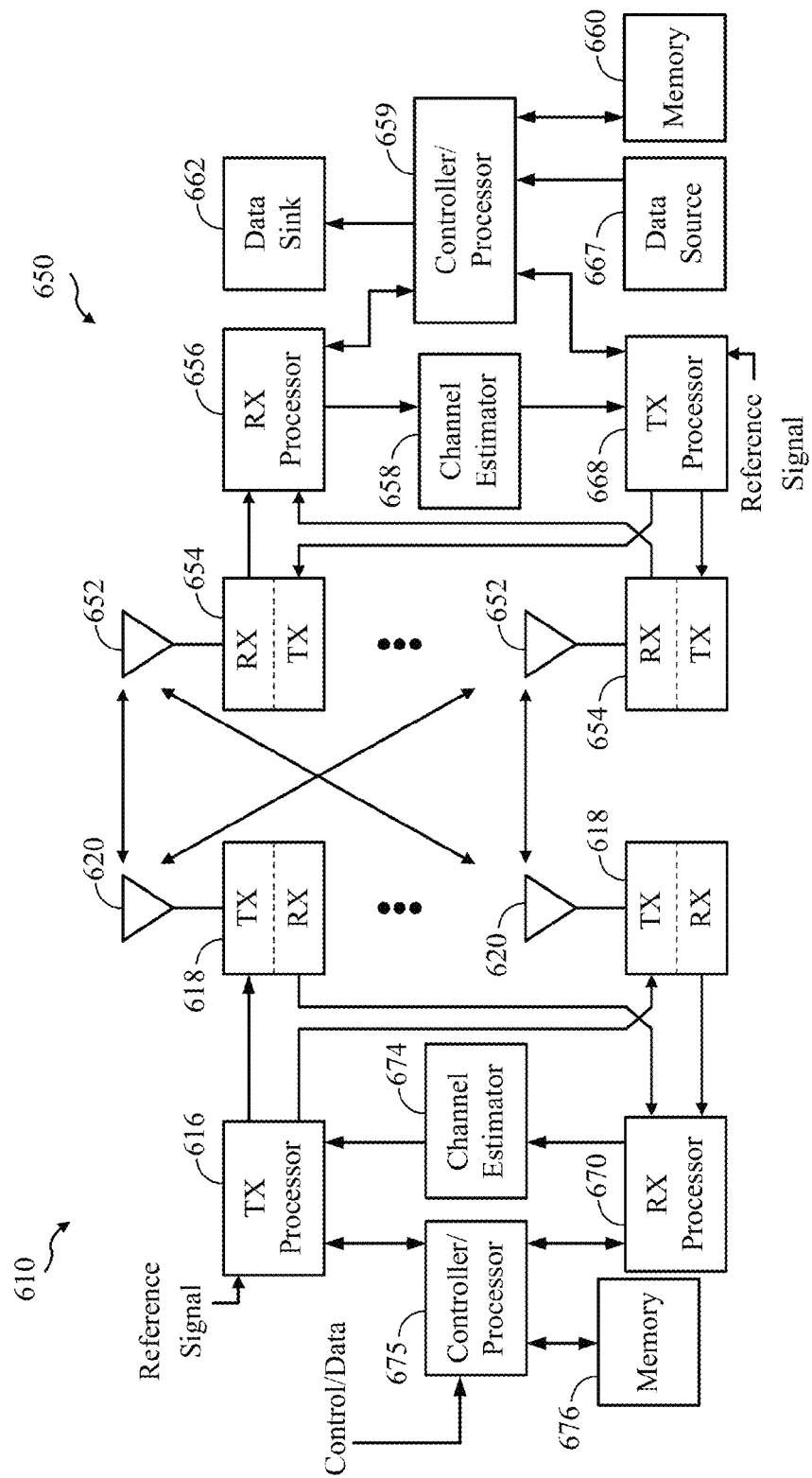
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Dynamic Power Scaling of Digital Modems

The 3rd and 4th generation wireless standards have a wide variance in processing complexity to implement different modes. The processing complexity specifications may be dependent on many factors including: effective data rate, the number of multiple input multiple output (MIMO) layers; receiver type (e.g., whether an advanced receiver is used); cell scenario (e.g., the number of transmitting antennas, MIMO Mode), and the number of carriers. The computational complexity of a system may be predicted using tables and/or mathematical formulas that provide the voltage and frequency of each processing block as output using the aforementioned factors.

Because power is a scarce resource, it is advantageous to provide systems and methods for managing power. Higher power consumption leads to decreased talk time and standby time for the UE. The present disclosure is directed to dynamically predicting a specified frequency and voltage combination to manage power. Further, the present disclosure is directed to the usage of a channel state indicator, (e.g., channel quality indicator (CQI)), reported by the UE as one of the factors in predicting the future data rates and accordingly power to be consumed.

Figure 7:
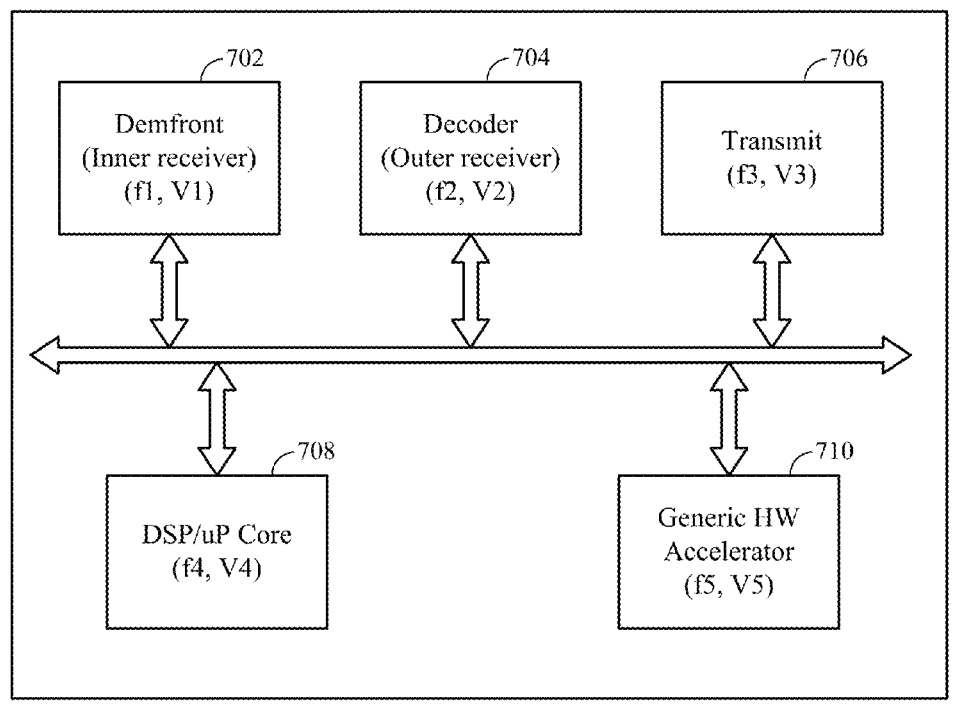
FIG. 7 is a diagram illustrating components of an example modem core, according to an aspect of the present disclosure.

FIG. 7 illustrates a modem core with an inner receiver 702, outer receiver 704, transmit module 706, DSP/microprocessor core 708, and a hardware (HW) accelerator 710. In one aspect, the components of the modem core have the same frequency and voltage. In particular, where the modem subsystem has only one power grid, the voltage may be fixed for all components. At the same voltage, lowering the clock frequency has power saving benefits. In one aspect, lowering the frequency to the smallest possible frequency improves overall performance.

In another aspect, each of the components of the modem core has a separate voltage and frequency, allowing for both voltage and frequency scaling. The voltage (V) and frequency (f) for each block may be derived individually based on particular processing specifications of the components. For example, the inner-receiver 702 may use higher voltage/frequency (f1, V1) than the outer-receiver 704 which uses frequency f2 and voltage V2. In FIG. 7, each block has its own frequency f1, f2, f3, f4, f5, and voltage V1, V2, V3, V4, V5.

One aspect of the present disclosure is directed to predicting future data rates. The UE reports a selected channel quality indicator (CQI) and/or rank indication (RI) value to the network. The rank indicator indicates the number of layers of MIMO that can be simultaneously transmitted. Additionally, the number of layers is proportional to the data rate. The CQI specifies the modulation and coding rate (determines efficiency) the network may use in future transmissions. For LTE, the effective data rate is proportional to (the number of Layers)*(efficiency)*(the number of sub-carriers). Together, the CQI and rank indicator specify the effective data rate recommended by the UE.

The network may, on its own, decide the modulation and coding rate. The future modulation and code rate value selected by the network is expected to be in a certain range of a UE reported value. Additionally, in another aspect, the number of MIMO layers used by the system may be predicted based on channel conditions and/or CQI.

FIG. 8 illustrates a CQI index table. For example, when the CQI index value is 1, the efficiency is approximately 0.15. A CQI value of 15 corresponds to a maximum data rate (assuming the same number of resource blocks are used). Assuming the same number of resource blocks are used, and considering MIMO, there is a difference of 74 times [2×5.55/0.15] between the lowest and highest data rate. In one aspect of the present disclosure, approximately knowing the CQI index allows for an approximate prediction of the data rate of the UE.

For example, assuming all resource blocks are allocated to one UE, a CQI index of 15 with one layer translates to data rate of 75 mbps (Megabits per second). The 75 mbps data rate corresponds to the maximum transport block size per layer (75376 bits) specified by the 3GPP standard for 20 MHz system with 100 resource blocks [Ref 3GPP spec 36.213-880 section 7.1.7.2.2]. In order to achieve 75 mbps per layer the network schedules the maximum transport block size every milli second resulting in 75 mbps (75376*1000) maximum data rate per layer. The data rate of other CQI values is calculated as follows:

$$\text{Data Rate}_{CQI\ Index\ X} = 75\ \text{mbps}*(\text{efficiency}_{CQI\ Index\ X}/5.5547)*\text{number of layers}.$$

The number of layers refers to the number of MIMO streams simultaneously transmitted on the same frequency. For example, for a CQI index of 10 and a layer of 2, the data rate is 75 mbps*(2.7305/5.5547)*2=73.73 mbps.

FIG. 8 also shows the modulation scheme and code rate corresponding to each CQI index. For example, a CQI value of 1 corresponds to a QPSK modulation scheme and a code rate of 78.

One aspect of the present disclosure is directed to predicting future data rates. For example, referring back to FIG. 7, for each processing block (i.e., components 702-710), the specified clock frequency and voltage is computed based on a first set of factors, such as, but not limited to, effective data rate, receiver type (e.g., whether an advanced receiver is used), the cell scenario (e.g., number of TX antennas, number of MIMO layers, MIMO Mode), and the number of carriers. Alternately, in another aspect, the specified clock frequency and voltage is pre-computed for only one block.

The effective data rate is then predicted as a function of the CQI value reported by the UE. Additionally, the predicted data rate may also be a function of current and past data rates. Next, the pre-computed clock and voltage are dynamically applied to the processing block(s).

Figure 9:
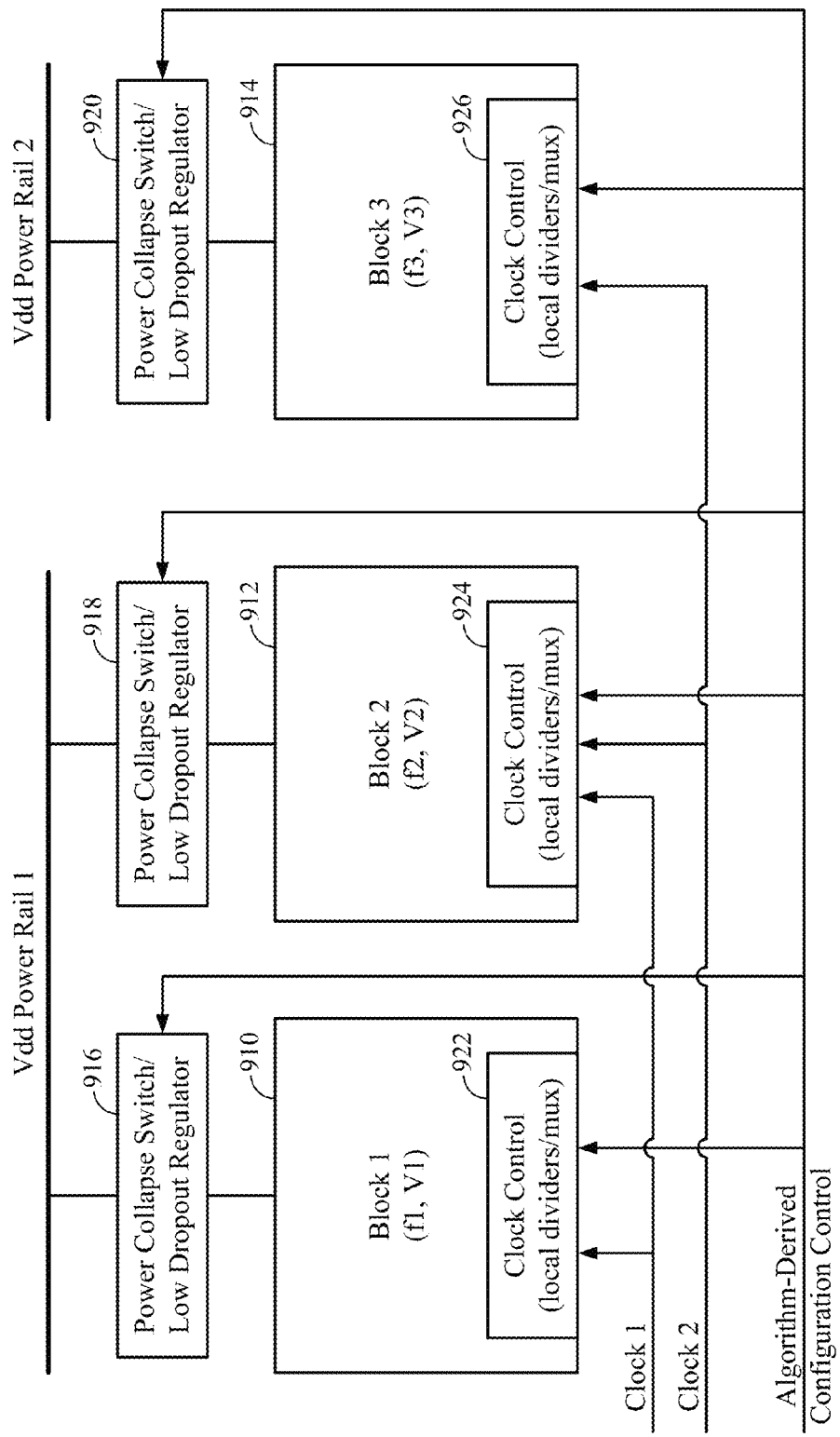
FIG. 9 is a block diagram of an implementation of a dynamic power scaling system, according to an aspect of the present disclosure.

FIG. 9 is an example of an implementation of a dynamically power scaled system. Typically, there are one or more phase locked loops (PLLs) that drive frequencies, which can then be reduced to the desired frequencies. In particular, in order to derive a particular frequency, a first ratio subdivider is applied to a first block 910, a different second ratio subdivider is applied to a second block 912, and a third different ratio subdivider is applied to a third block 914. The ratios are computed based on effective data rate, receiver type (e.g., whether an advanced receiver is used), the cell scenario (e.g., number of TX antennas, number of MIMO layers, MIMO Mode), and the number of carriers. The effective data rate being predicted is a function of the CQI value reported by the UE. The effective data rate can also be a function of current and past data rates.

In one aspect, a block is able to look up a CQI value and adjust frequency accordingly. For example, algorithm derived configuration control lines apply the computed frequencies to drive block-owned clock control components 922, 924, 926 to select appropriate clock sources and sub-divider ratios.

On a macro-scale level, the pre-computed voltages drive external power management integrated circuits (IC) that can tune overall Vdd power rails. On a micro-scale level, algorithm derived configuration control lines apply the pre-computed voltages to drive block-owned power collapse switches and/or low drop-out (LDO) regulators. The power collapse switches 916, 918 and 920 allow certain blocks to be completely powered down if not being used. The LDO regulators allow turning down the voltage from a common-shared power rail. In another configuration (shown in FIG. 9), a modem includes multiple power grids (Vdd Power Rail 1 and Vdd Power Rail 2) to control various blocks and/or applications.

Thus, the first block 910 can operate at a first frequency f1, and voltage V1. On the other hand, the second block 912, and the third block 914 can operate at their own frequencies f2, f3 respectively, and voltages V2, V3, respectively.

Although FIG. 9 is an example illustrating multiple power controllers controlling separate blocks. Those skilled in the art will appreciate that one power controller may be used to control all blocks. Similarly, a single clock control element can control all blocks 910, 912, 914.

Figure 10:
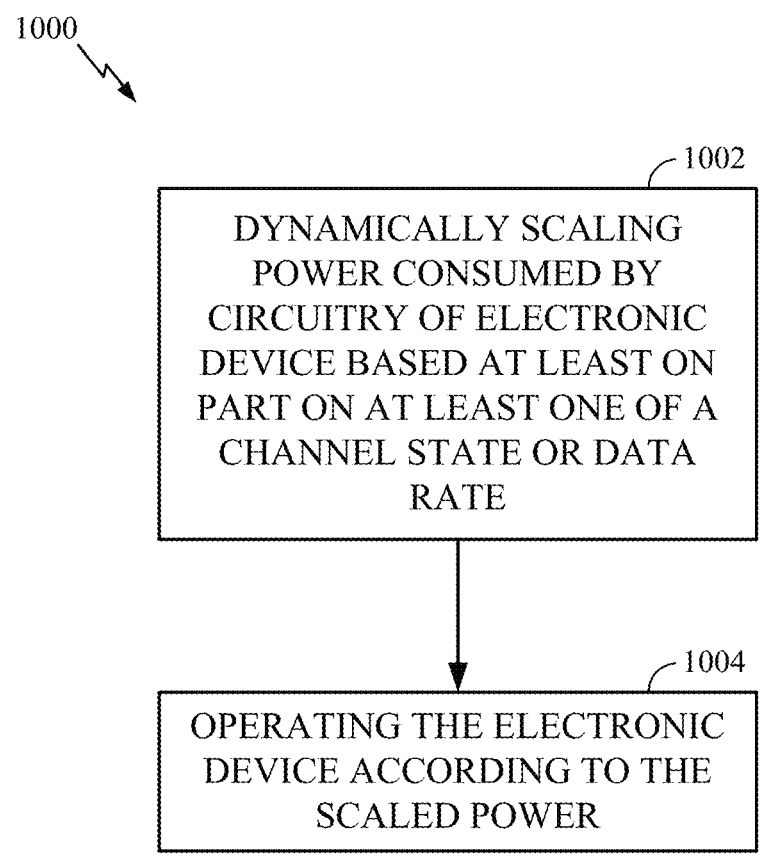
FIG. 10 is a block diagram illustrating a method of dynamic power scaling for digital modems, according to an aspect of the present disclosure.

FIG. 10 illustrates a method 1000 for dynamic power scaling of digital modems. At block 1002, the power consumed by the circuitry of an electronic device is dynamically scaled. In one aspect, the power scaling may be based in part on channel state and/or date rate. At block 1004, the electronic device operates according to the scaled power.

Figure 11:
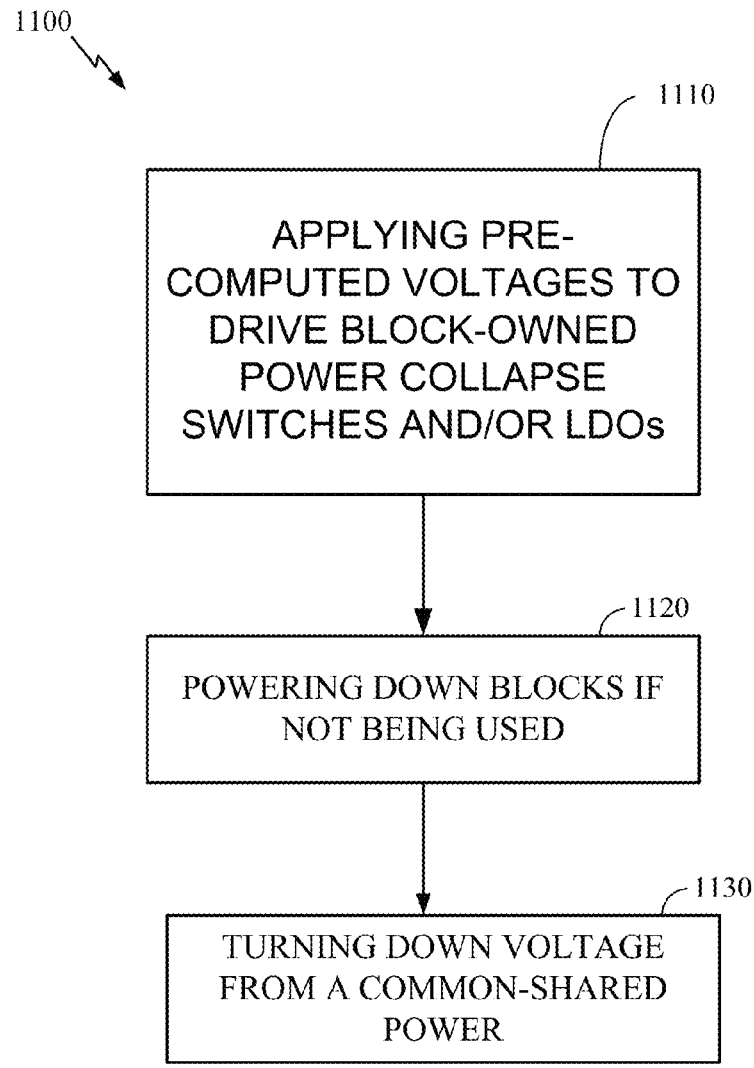
FIG. 11 is a block diagram illustrating a method of external power management for integrated circuits, according to an aspect of the present disclosure.

FIG. 11 illustrates a method 1100 of driving external power management integrated circuits (IC) that can tune overall Vdd power rails using pre-computed voltages. At block 1010, configuration control lines apply the pre-computed voltages to drive block-owned power collapse switches and/or low drop-out (LDO) regulators. At block 1020, power collapse switches 916, 918 and 920 allow certain blocks to be completely powered down if not being used. At block 1130, LDO regulators allow turning down the voltage from a common-shared power rail.

In one configuration, the UE 650 is configured for wireless communication including means for dynamically scaling power. In one aspect, the dynamic scaling power means may be the controller processor 659 and/or memory 660 configured to perform the functions recited by the dynamic scaling power means. The UE 650 is also configured to include a means for operating according to the scaled power. In one aspect, the operating means may be the controller processor 659 and/or memory 660 configured to perform the functions recited by the operating means. In another aspect, the aforementioned means may be any module or any apparatus configured to perform the functions recited by the aforementioned means.

Figure 12:
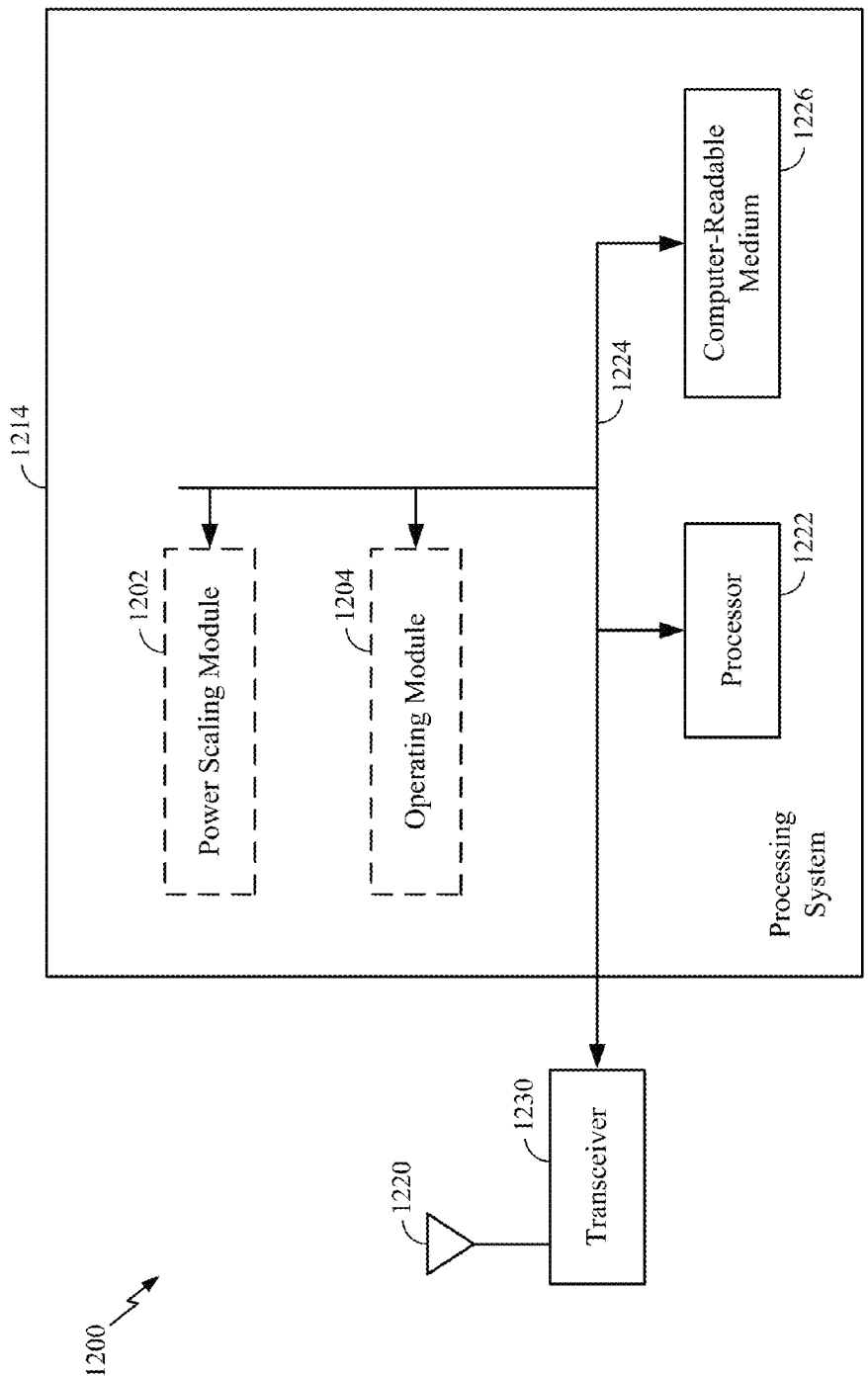
FIG. 12 is a block diagram illustrating different modules/means/components in an exemplary apparatus, according to an aspect of the present disclosure.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system includes a power scaling module 1202. The power scaling module can dynamically scale the power of an electronic device. The processing system also includes an operating module 1204. The operating module 1204 can operate the electronic device according to the scaled power. The modules may be software modules running in the processor 1222, resident/stored in the computer readable medium 1226, one or more hardware modules coupled to the processor 1222, or some combination thereof. The processing system 1214 may be a component of the UE 650 and may include the memory 660 and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   predicting future data rates based at least in part on a number of multiple input multiple output (MIMO) layers, a receiver type, a cell scenario, a number of carriers, an effective data rate, or a combination thereof, and the cell scenario comprising at least a number of transmission antennas, or a MIMO mode, or a combination thereof; and
   dynamically scaling power consumed by circuitry of an electronic device by scaling voltage and frequency based at least in part on the predicted future data rates.

2. The method according to claim 1, wherein the frequency is dynamically scaled by applying subdivider ratios.

3. The method of claim 1, in which the predicted future data rates are predicted based at least in part on a pre-computed table or a mathematical formula.

4. The method of claim 1, further comprising determining a number of MIMO layers based at least in part on at least channel conditions, a channel quality index (CQI), or a combination thereof.

5. The method of claim 1, further comprising dynamically scaling voltage and frequency separately for a plurality of components of the circuitry.

6. The method of claim 1, in which the dynamically scaling further comprises powering down at least one circuit.

7. The method of claim 6, in which the powering down at least one circuit further comprises driving power collapse switches.

8. The method of claim 1, in which the dynamically scaling further comprises tuning power rails.

9. The method of claim 1, in which the channel state corresponds to a channel quality indicator (CQI) index value reported by a user equipment (UE).

10. The method of claim 1, further comprising predicting the effective data rate based at least in part on a CQI, a current data rate, a previous data rate, or a combination thereof.

11. An apparatus for wireless communication, comprising:
    a memory; and
    at least one processor coupled to the memory, the at least one processor being configured:
        to predict future data rates based at least in part on a number of multiple input multiple output (MIMO) layers, a receiver type, a cell scenario, a number of carriers, an effective data rate, or a combination thereof, and the cell scenario comprising at least a number of transmission antennas, or a MIMO mode, or a combination thereof; and
        to dynamically scale power consumed by circuitry of an electronic device by scaling voltage and frequency based at least in part on the predicted future data rates.

12. The apparatus of claim 11, wherein the frequency is dynamically scaled by applying subdivider ratios.

13. The apparatus of claim 11, in which the predicted future data rates are predicted based at least in part on a pre-computed table or a mathematical formula.

14. The apparatus of claim 11, in which the at least one processor is further configured to determine a number of MIMO layers based at least in part on at least channel conditions, a channel quality index (CQI), or a combination thereof.

15. The apparatus of claim 11, in which the at least one processor is further configured to dynamically scale voltage and frequency separately for a plurality of components of the circuitry.

16. The apparatus of claim 11, in which the at least one processor is further configured to dynamically scale by powering down at least one circuit.

17. The apparatus of claim 16, in which the at least one processor is further configured to power down at least one circuit by driving power collapse switches.

18. The apparatus of claim 11, in which the at least one processor is further configured to dynamically scale by tuning power rails.

19. The apparatus of claim 11, in which the channel state corresponds to a channel quality indicator (CQI) index value reported by a user equipment (UE).

20. The apparatus of claim 11, in which the at least one processor is further configured to predict the effective data rate based at least in part on a CQI, a current data rate, a previous data rate, or a combination thereof.

21. A non-transitory computer-readable medium having non-transitory program code recorded thereon, the program code comprising:
   program code to predict future data rates based at least in part on a number of multiple input multiple output (MIMO) layers, a receiver type, a cell scenario, a number of carriers, an effective data rate, or a combination thereof, a previous data rate, or combination thereof, and the cell scenario comprising at least a number of transmission antennas, or a MIMO mode, or a combination thereof; and
   program code to dynamically scale power consumed by circuitry of an electronic device by scaling voltage and frequency based at least in part on the predicted future data rates.

22. An apparatus for wireless communication, comprising:
   means for predicting future data rates based at least in part on a number of multiple input multiple output (MIMO) layers, a receiver type, a cell scenario, a number of carriers, an effective data rate, or a combination thereof, and the cell scenario comprising at least a number of transmission antennas, or a MIMO mode, or a combination thereof;
   means for dynamically scaling power consumed by circuitry of an electronic device by scaling voltage and frequency based at least in part on the predicted future data rates; and
   means for operating the electronic device according to the scaled power.

* * * * *